(12) United States Patent  
Shimizu et al.

(10) Patent No.: US 9,191,559 B2
(45) Date of Patent: Nov. 17, 2015

(54) CAMERA MODULE, MANUFACTURING APPARATUS, AND MANUFACTURING METHOD

(75) Inventors: Masahiko Shimizu, Kanagawa (JP); Toshiaki Iwafuchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/565,246

(22) Filed: Aug. 2, 2012

(65) Prior Publication Data

US 2013/0038783 A1 Feb. 14, 2013

(30) Foreign Application Priority Data

Aug. 9, 2011 (JP) .................................. 2011-173694

(51) Int. Cl.
*H04N 5/225* (2006.01)

(52) U.S. Cl.
CPC ......... *H04N 5/2254* (2013.01); *Y10T 29/49002* (2015.01); *Y10T 29/5313* (2015.01)

(58) Field of Classification Search
CPC ............ H04N 5/2254; H04N 5/23212; H04N 5/2253; H04N 5/232; G02B 7/646; G02B 7/04; G03B 3/10
USPC .................................................. 348/360, 373
See application file for complete search history.

(56) References Cited

U.S. PATENT DOCUMENTS

| | | | |
|---|---|---|---|
| 7,084,391 B1 * | 8/2006 | Chen | 250/239 |
| 7,576,778 B2 * | 8/2009 | Hirota et al. | 348/208.5 |
| 8,355,075 B2 * | 1/2013 | Shiraishi | 348/374 |
| 2001/0050721 A1 * | 12/2001 | Miyake | 348/374 |
| 2002/0106199 A1 * | 8/2002 | Ikeda | 386/120 |
| 2007/0248344 A1 * | 10/2007 | Santo et al. | 396/91 |
| 2008/0025701 A1 * | 1/2008 | Ikeda | 386/120 |
| 2009/0051774 A1 * | 2/2009 | Shiraishi | 348/207.99 |
| 2010/0085473 A1 * | 4/2010 | Shiung et al. | 348/373 |
| 2010/0259616 A1 * | 10/2010 | Nakajima et al. | 348/148 |
| 2010/0309353 A1 * | 12/2010 | Hagiwara | 348/294 |
| 2011/0032400 A1 * | 2/2011 | Yang | 348/294 |
| 2011/0115918 A1 * | 5/2011 | Webster | 348/164 |
| 2011/0176046 A1 * | 7/2011 | Hu et al. | 348/335 |

FOREIGN PATENT DOCUMENTS

JP 2004-296453 10/2004

* cited by examiner

*Primary Examiner* — Aung S Moe
*Assistant Examiner* — Amy Hsu
(74) *Attorney, Agent, or Firm* — Hazuki International, LLC

(57) ABSTRACT

A camera module includes an imaging sensor, a conductive member, a plate-like member, and a sealing member. The imaging sensor includes a light-receiving surface configured to receive light gathered by a lens unit, the lens unit including a lens and a drive section driving the lens. The conductive member is connected to the drive section for supply of power to the drive section. The plate-like member is provided with the imaging sensor and the conductive member. The sealing member is formed by sealing the imaging sensor and the conductive member, the conductive member being exposed at a connection part for connection to the drive section, the imaging sensor being exposed at the light-receiving surface.

8 Claims, 5 Drawing Sheets

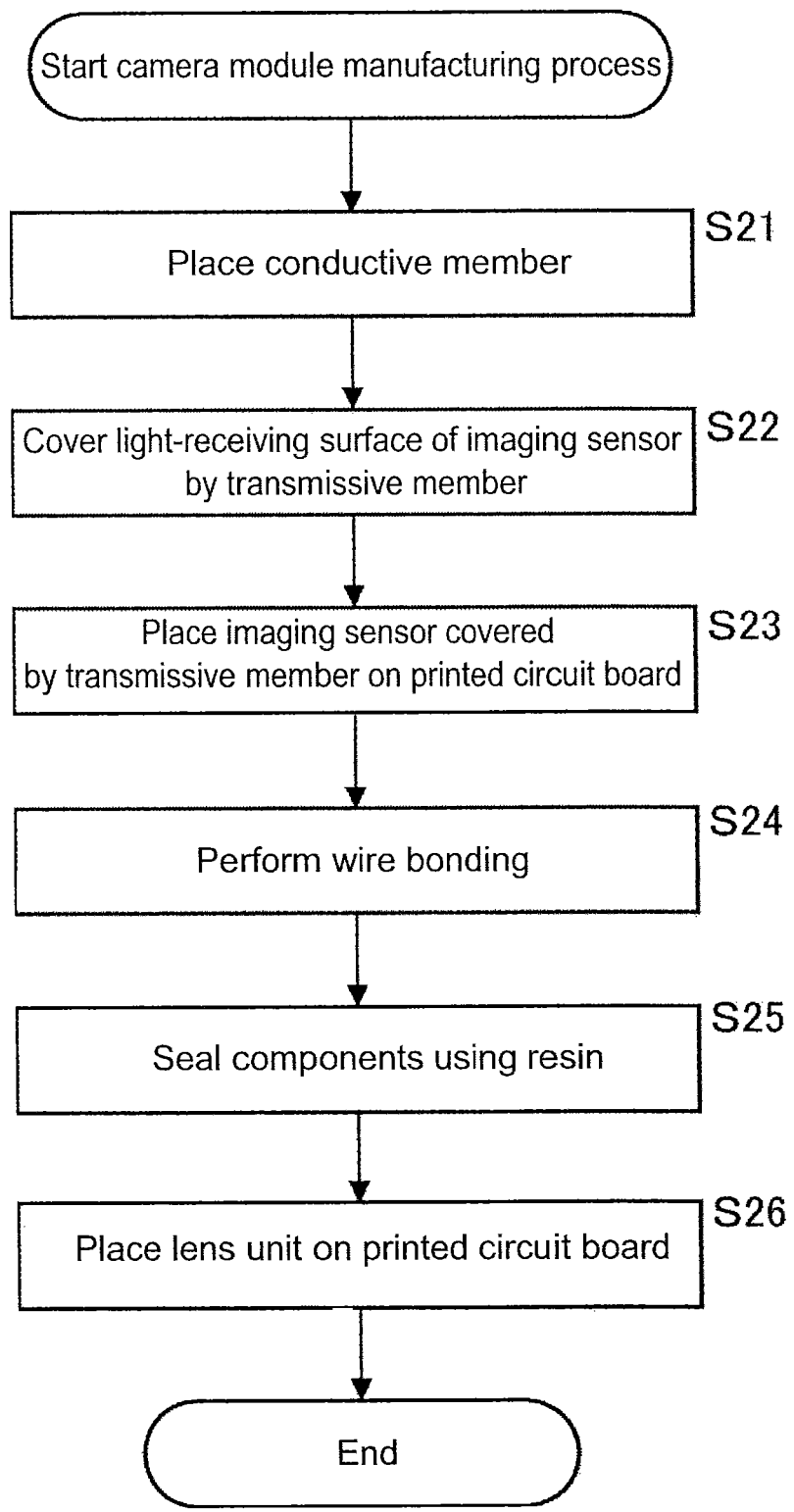

CAMERA MODULE, MANUFACTURING APPARATUS, AND MANUFACTURING METHOD

BACKGROUND

The present disclosure relates to a camera module, a manufacturing apparatus, and a manufacturing method and, more specifically, to a camera module, a manufacturing apparatus, and a manufacturing method that realize space-saving connection between an actuator that operates to drive a camera lens and a printed circuit board, for example.

There has been proposed a fixed-focus camera module in which a printed circuit board is sealed (hermetically sealed) by resin with an image sensor attached thereon to expose only the light-receiving surface of the image sensor, for example. As an example, see Japanese Patent Application Laid-open No. 2004-296453 (hereinafter, referred to as Patent Document 1).

SUMMARY

In the fixed-focus camera module, a lens for gathering light to be received on the light-receiving surface is fixed, and thus is not expected to be driven.

On the other hand, for a general camera module to realize autofocus of setting the focus automatically by driving of a lens, or to realize image stabilization of reducing any influence of camera shake by driving the lens in response to the camera shake, for example, an electrical connection is expected to be taken into consideration between an actuator that operates to drive the lens, and a printed circuit board.

With the above-described fixed-focus camera module of Patent Document 1, however, the lens is not expected to be driven. There thus is no description about an electrical connection between the actuator and the printed circuit board.

It is thus desirable to realize space-saving connection between an actuator that operates to drive a camera lens, and a printed circuit board.

A camera module according a first embodiment of the present disclosure includes an imaging sensor, a conductive member, a plate-like member, and a sealing member. The imaging sensor includes a light-receiving surface configured to receive light gathered by a lens unit, the lens unit including a lens and a drive section driving the lens. The conductive member is connected to the drive section for supply of power to the drive section. The plate-like member is provided with the imaging sensor and the conductive member. The sealing member is formed by sealing the imaging sensor and the conductive member, the conductive member being exposed at a connection part for connection to the drive section, the imaging sensor being exposed at the light-receiving surface.

The plate-like member is provided with the lens unit to cover the imaging sensor, and the connection part and the light-receiving surface are exposed from a surface of the sealing member opposing the lens unit.

The camera module according to the first embodiment further include a transmissive member covering the light-receiving surface of the imaging sensor to pass therethrough the light from the lens unit. The sealing member is formed by sealing the imaging sensor and the conductive member in a state where the connection part and the light-receiving surface are exposed, the light-receiving surface being covered by the transmissive member.

The imaging sensor is electrically connected to the plate-like member by at least one of a through electrode and an adhesion electrode, the through electrode being formed by going through the imaging sensor, the adhesion electrode being formed by adhering to the imaging sensor.

According to the first embodiment of the present disclosure, the sealing member is formed by sealing the imaging sensor and the conductive member, the conductive member being exposed at the connection part for connection to the drive section, and the imaging sensor being exposed at the light-receiving surface.

A manufacturing apparatus according to a second embodiment of the present disclosure includes a placement section, and a sealing section. The placement section is configured to provide a conductive member to a plate-like member including an imaging sensor, the imaging sensor including a light-receiving surface configured to receive light gathered by a lens unit, the lens unit including a lens and a drive section driving the lens, the conductive member being connected to the drive section for supply of power to the drive section. The sealing section is configured to seal the imaging sensor and the conductive member, the conductive member being exposed at a connection part for connection with the drive section, the imaging sensor being exposed at the light-receiving surface.

A method of manufacturing a camera module by the manufacturing apparatus according to the second embodiment of the present disclosure includes, for execution by the manufacturing apparatus, a providing step and a sealing step. The providing step is to provide a conductive member to a plate-like member including an imaging sensor, the imaging sensor including a light-receiving surface configured to receive light gathered by a lens unit, the lens unit including a lens and a drive section driving the lens, the conductive member being connected to the drive section for supply of power to the drive section. The sealing step is to seal the imaging sensor and the conductive member, the conductive member being exposed at a connection part for connection with the drive section, the imaging sensor being exposed at the light-receiving surface.

According to the second embodiment of the present disclosure, the conductive member is provided to the plate-like member including the imaging sensor, the imaging sensor including the light-receiving surface configured to receive light gathered by the lens unit, the lens unit including the lens, and the drive section driving the lens, the conductive member being connected to the drive section for supply of power to the drive section. The imaging sensor and the conductive member are sealed together in the state where the conductive member is exposed at the connection part for connection with the drive section, and the imaging sensor is exposed at the light-receiving surface.

According to the first embodiment of the present disclosure, space saving connection is realized between the drive section for driving the camera lens, and the conductive member so that the resulting camera module is favorably reduced in size.

Moreover, according to the second embodiment of the present disclosure, space saving connection is realized between the drive section for driving the camera lens, and the conductive member, thereby being able to manufacture a small-sized camera module.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 5 is a flowchart of a camera module manufacturing process to be performed by the manufacturing apparatus.

DETAILED DESCRIPTION OF EMBODIMENT

Hereinafter, an embodiment of the present disclosure (hereinafter, simply referred to as embodiment) will be described. The description is given in the following order.
1. Embodiment
2. Modification Examples 1. Embodiment FIGS. 1A, 1B, 1C, 2D, and 2E each show the overview of a method of manufacturing a camera module.

The targets for this manufacturing method are a plurality of printed circuit boards $21_1$ to $21_N$, which form a piece of plate-like member. In the below, when no distinction is expected among these printed circuit boards $21_1$ to $21_N$, these printed circuit boards $21_1$ to $21_N$ are simply referred to as the printed circuit board $21_n$ (n=1, 2, . . . , and N).

Figure 1A:
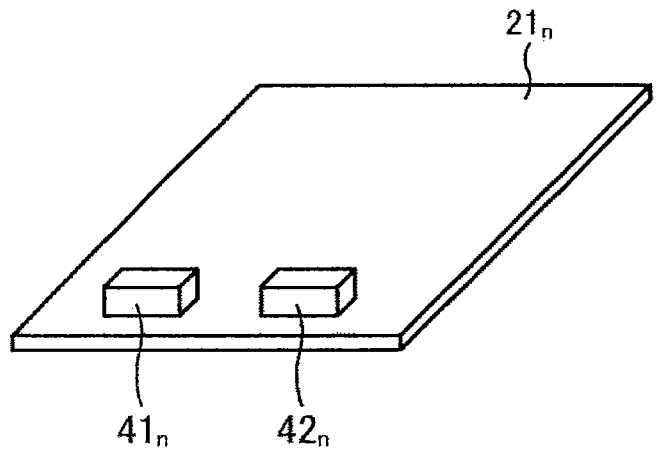
FIGS. 1A to 1C are each a first diagram for illustrating the overview of a camera module manufacturing process.

First of all, as shown in FIG. 1A, the printed circuit board $21_n$ is provided thereon with conductive members $41_n$ and $42_n$ together with surface-mounted components that are not shown. Note that the conductive members $41_n$ and $42_n$ are so provided as to be connected to a power line, which is provided on the printed circuit board $21_n$ for supply of power, for example.

Figure 1B:
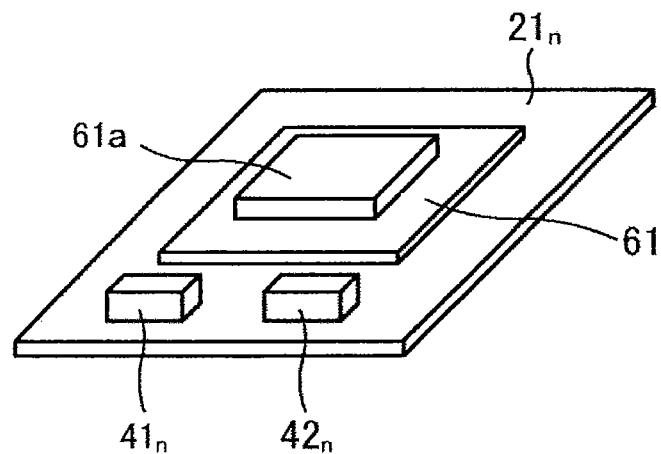

As shown in FIG. 1B, a process of die bonding is performed, i.e., an imaging sensor 61 is provided at the center of the printed circuit board $21_n$ for attachment. The imaging sensor 61 has a light-receiving surface of imaging elements, and the light-receiving surface is covered by a transmissive member 61a.

Figure 1C:
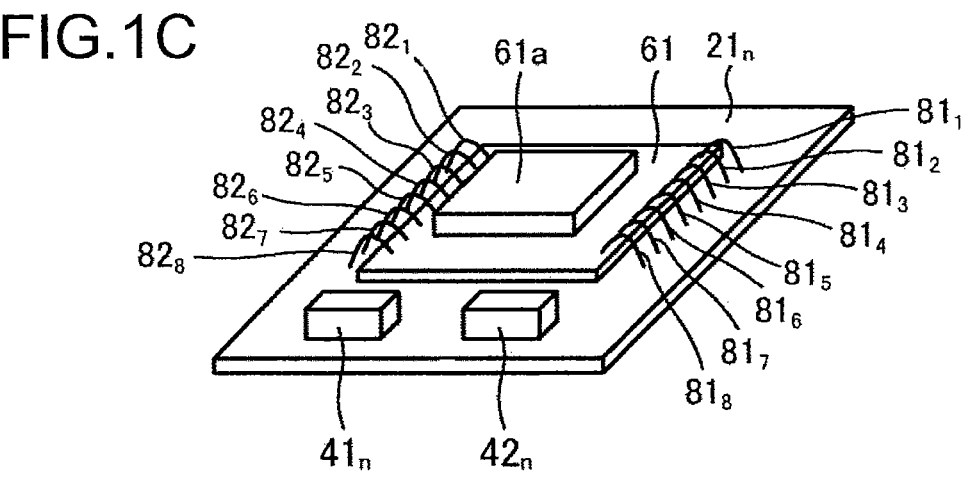

After the process of die bonding, as shown in FIG. 1C, a process of wire bonding is performed, i.e., metal wires $81_1$ to $81_8$ and metal wires $82_1$ to $82_8$ are used for connection between an inner lead (not shown) on the printed circuit board $21_n$, and an electrode pad (not shown) on the imaging sensor 61.

Figure 2D:
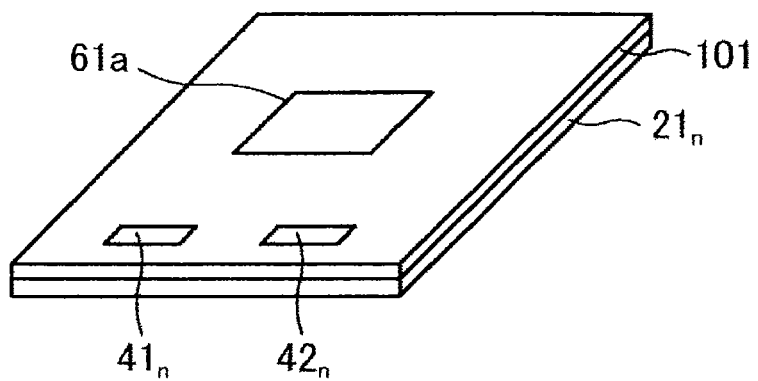
FIGS. 2D and 2E are each a second diagram for illustrating the overview of the camera module manufacturing process.

After the process of wire bonding, as shown in FIG. 2D, a sealing resin 101 is used to seal the components on the printed circuit board $21_n$, e.g., the imaging sensor 61, the surface-mounted components that are not shown, and the conductive members $41_n$ and $42_n$. The components are so sealed as to expose the surfaces of the components on the printed circuit board $21_n$, i.e., the conductive members $41_n$ and $42_n$, and the transmissive member 61a.

Herein, for sealing the components on the printed circuit board $21_n$ using the sealing resin 101 as such, the sealing resin 101 that has been molded (molded using a casting mold such as metal mold) may be provided on the printed circuit board $21_n$ as shown in FIG. 2D, for example.

Alternatively, the sealing resin 101 in the form of liquid may be poured onto the printed circuit board $21_n$, and then be made solid by a heating process or others to be provided on the printed circuit board $21_n$, for example.

In this example, the sealing resin 101 in use is a resin in black with light-shielding properties. With the resin as such, light entering the metal wires $81_1$ to $81_8$ and the metal wires $82_1$ to $82_8$ is reflected, and then is received on the light-receiving surface of the imaging sensor 61, for example. This accordingly prevents ghosts or others from occurring in images to be generated by the imaging sensor 61. As an alternative to the sealing resin 101, any material other than resin may be used to seal the components on the printed circuit board $21_n$.

After the surface of the printed circuit board $21_n$ is covered by the sealing resin 101, a process of singulation is performed, i.e., a plate-like member is divided (cut) into a plurality of printed circuit boards $21_1$ to $21_N$.

The process of singulation is not necessarily performed only after the surface of the printed circuit board $21_n$ is covered by the sealing resin 101, but may be performed at an arbitrary timing. That is, the process of singulation may be performed after the conductive members $41_n$ and $42_n$ are provided on the printed circuit board $21_n$, for example.

Figure 2E:
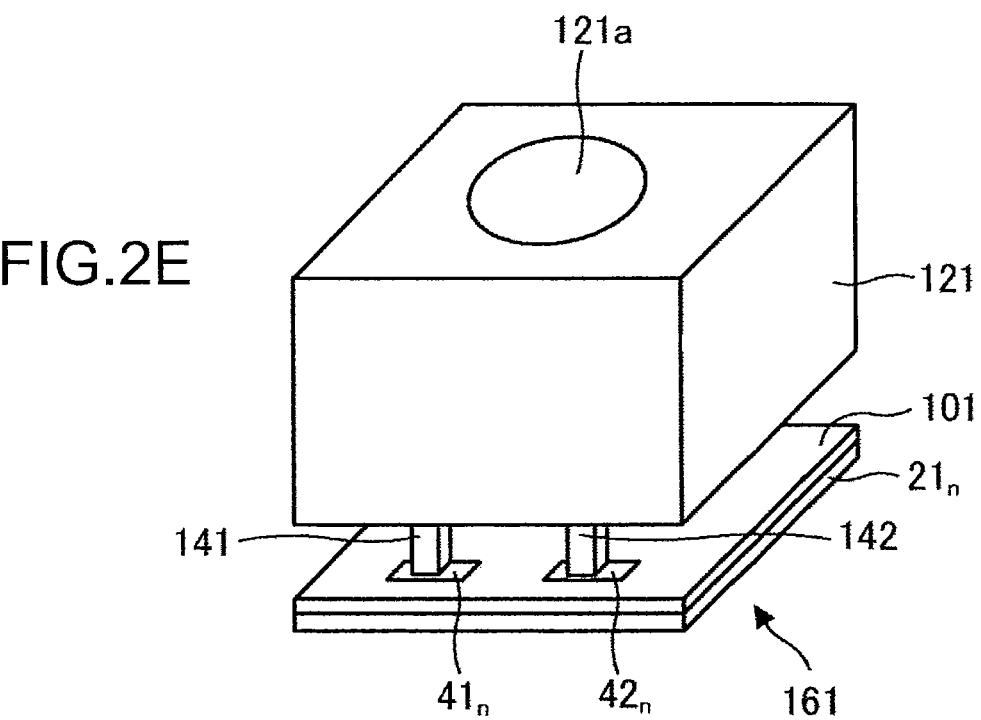

After the process of singulation, as shown in FIG. 2E, a lens unit 121 is attached onto the sealing resin 101 using an adhesive or others. The lens unit 121 is then connected with, at one end of each of connection terminals 141 and 142 thereof, the conductive members $41_n$ and $42_n$ on the printed circuit board $21_n$. As a result, a camera module 161 is manufactured.

As shown in FIG. 2E, the lens unit 121 is in the shape of chassis including an aperture portion 121a on the upper side of the drawing. This aperture portion 121a serves as a port for light beams to enter. The chassis of the lens unit 121 includes a plurality of lenses, and an actuator. The lenses are driven at the time of autofocus or image stabilization, and the actuator drives the lenses. This actuator is connected to the remaining ends of the connection terminals 141 and 142 not connected to the lens unit 121.

[Exemplary Configuration of Camera Module 161]

Figure 3:
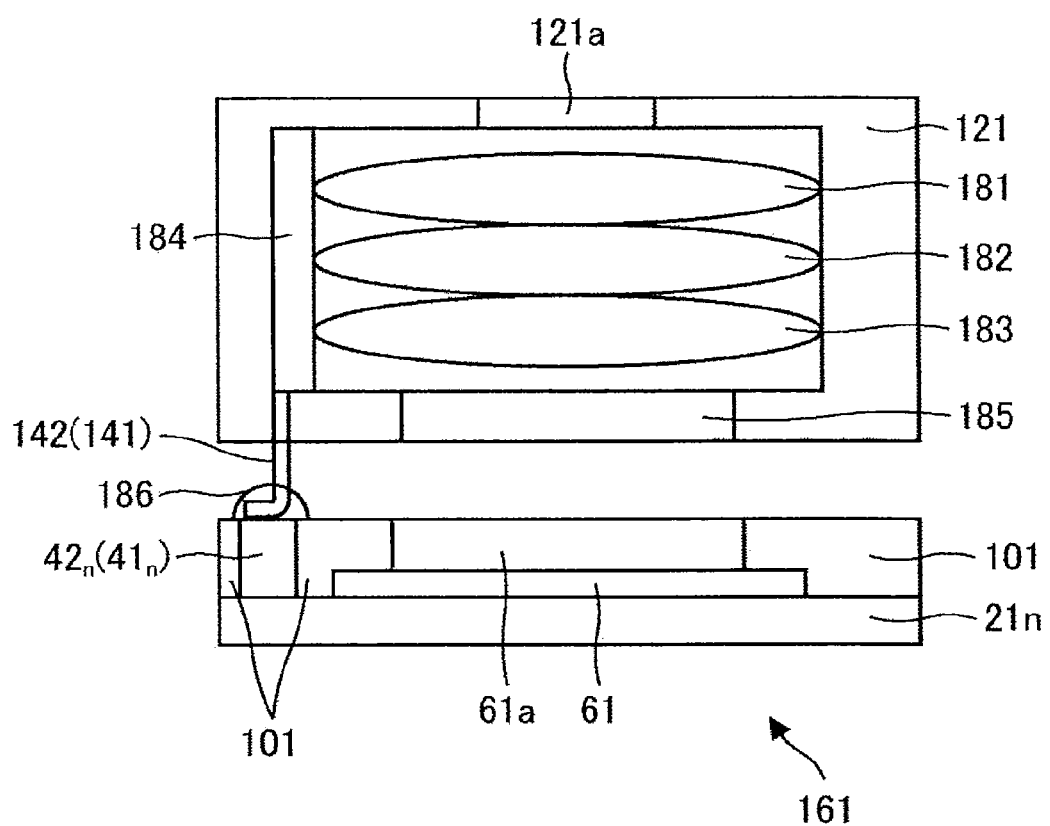
FIG. 3 is a diagram showing an exemplary camera module to be manufactured by the camera module manufacturing process.

FIG. 3 shows a cross-sectional view of the camera module 161 to be manufactured by the manufacturing method described above.

This camera module 161 is configured to include, mainly, the printed circuit board $21_n$, the conductive members $41_n$ and $42_n$, the imaging sensor 61, the transmissive member 61a, the sealing resin 101, and the lens unit 121.

These components, i.e., the printed circuit board $21_n$, the conductive members $41_n$ and $42_n$, the imaging sensor 61, the transmissive member 61a, and the sealing resin 101, are described above by referring to FIGS. 1A to 2E, and thus are not described again as appropriate.

That is, described by referring to FIG. 3 is the internal configuration of the lens unit 121.

The lens unit 121 is a chassis as shown in FIG. 3, and the chassis includes a plurality of lenses 181 to 183, and an actuator 184 for driving these lenses 181 to 183. The light gathered by the lens unit 121 passes through the transmissive member 61a, and then is received on the light-receiving surface on the imaging sensor 61.

The lenses 181 to 183 are each driven by the actuator 184 at the time of autofocus or image stabilization. Note that the bottom surface of the lens unit 121 is formed with an infrared cut filter 185. The bottom surface herein is the surface opposite to the surface formed with the aperture portion 121a.

The actuator 184 is connected with the connection terminals 141 and 142 for connection with the conductive members $41_n$ and $42_n$, respectively.

The actuator 184 drives the lenses 181 to 183 by power coming from the printed circuit board $21_n$ via the conductive member $42_n$ ($41_n$) and the connection terminal 142 (141).

As exemplarily shown in FIG. 3, the connection terminals 141 and 142 are respectively electrically connected with the conductive members $41_n$ and $42_n$ by soldering 186. As an alternative to the soldering 186, the use of a conductive adhesive is also possible.

The connection terminal 141 is not pulled out from the side surface of the lens unit 121, i.e., from the surface thereof on the left side of the drawing, for example, but is pulled out from the bottom surface of the chassis of the lens unit 121, i.e., from the surface thereof on the lower side of the drawing.

Compared with the configuration in which the connection terminal 141 is pulled out from the side surface of the lens unit 121, i.e., from the surface thereof on the left side of the drawing, for example, this configuration allows size reduction of the camera module 161 by the space of the connection terminal 141.

Moreover, the connection surface of the conductive member $42_n$ ($41_n$) is not exposed from the side surface of the printed circuit board $21_n$, i.e., from the surface thereof on the left side of the drawing, for example, but is exposed from the surface on the printed circuit board $21_n$ (the sealing resin 101), i.e., the surface thereof on the upper side of the drawing, opposing to the lens unit 121 provided so as to cover the imaging sensor 61.

As such, compared with the configuration in which the connection terminal 141 is connected to the side surface of the printed circuit board $21_n$ because the connection surface of the conductive member $42_n$ ($41_n$) is exposed to the side surface of the printed circuit board $21_n$, i.e., to the surface thereof on the left side of the drawing, this configuration allows size reduction of the camera module 161 by the space of the connection terminal 141 connected on the side surface of the printed circuit board $21_n$.

In the printed circuit board $21_n$, the imaging sensor 61 and the transmissive member 61a have the same thickness, i.e., the height in the vertical direction in the drawing, as the thickness (height) of the conductive member $42_n$ ($41_n$). As shown in FIG. 3, the sealing resin 101 is provided up to the height of the conductive member $42_n$ ($41_n$) from the surface of the printed circuit board $21_n$.

However, the sealing resin 101 is not restricted to the shape of FIG. 3, and may be in any other shape as long as the surfaces of the components on the printed circuit board $21_n$ are exposed therefrom, i.e., the conductive members $42_n$ and $41_n$, and the transmissive member 61a.

When the conductive member $42_n$ ($41_n$) has the thickness different from that of the imaging sensor 61 and the transmissive member 61a, for example, the sealing resin 101 is similarly shaped to expose the surfaces of the components on the printed circuit board $21_n$, i.e., the conductive members $42_n$ and $41_n$, and the transmissive member 61a.

With the sealing resin 101 shaped as such, the conductive member $41_n$ or others may not be buried thereunder at the time of manufacturing the camera module 161.

Alternatively, the following approach is possible to expose the surfaces of the components on the printed circuit board $21_n$, i.e., the conductive members $42_n$ and $41_n$, and the transmissive member 61a, from the sealing resin 101.

That is, as an approach for exposure, irrespective of the thickness of the conductive member $42_n$ ($41_n$), the sealing resin 101 may be provided up to the thickness of the imaging sensor 61 and the transmissive member 61a, for example. When the conductive member $42_n$ ($41_n$) is buried under the sealing resin 101, a dicing blade may be used to cut the sealing resin 101 to expose the conductive member $42_n$ ($41_n$) from the sealing resin 101.

Such an approach for exposure, however, involves another process of cutting the sealing resin 101 by also using the dicing blade to expose the conductive member $42_n$ ($41_n$) buried under the sealing resin 101. This reduces the productivity of the camera module 161.

Further, this approach for exposure also involves a process of removing dust generated due to cutting of not only the sealing resin 101 but also the conductive member $42_n$ ($41_n$) using the dicing blade.

Still further, due to adhesion of the dust generated as such, the camera module 161 is disadvantageously impaired in performance.

In consideration thereof, with the camera module 161 according to the embodiment of the present disclosure, the sealing resin 101 is so shaped as not to bury the conductive member $41_n$ thereunder so that no such additional process is to be involved.

As such, because no such cutting process using the dicing blade is involved any more to expose the conductive member $42_n$ ($41_n$) from the sealing resin 101, the productivity of the camera module 161 is not reduced.

Also with the camera module 161, no such cutting process using the dicing blade is involved any more to expose the conductive member $42_n$ ($41_n$) from the sealing resin 101, thereby favorably suppressing reduction of yields and adhesion of dust. Herein, the yields mean the number of product units actually put to use compared to the amount of raw materials or others used in the manufacturing process.

Also with the camera module 161, the adhesion of dust is reduced, thereby suppressing deterioration in performance due to adhesion of dust.

[Exemplary Manufacturing Apparatus 201 Manufacturing Camera Module 161]

Figure 4:
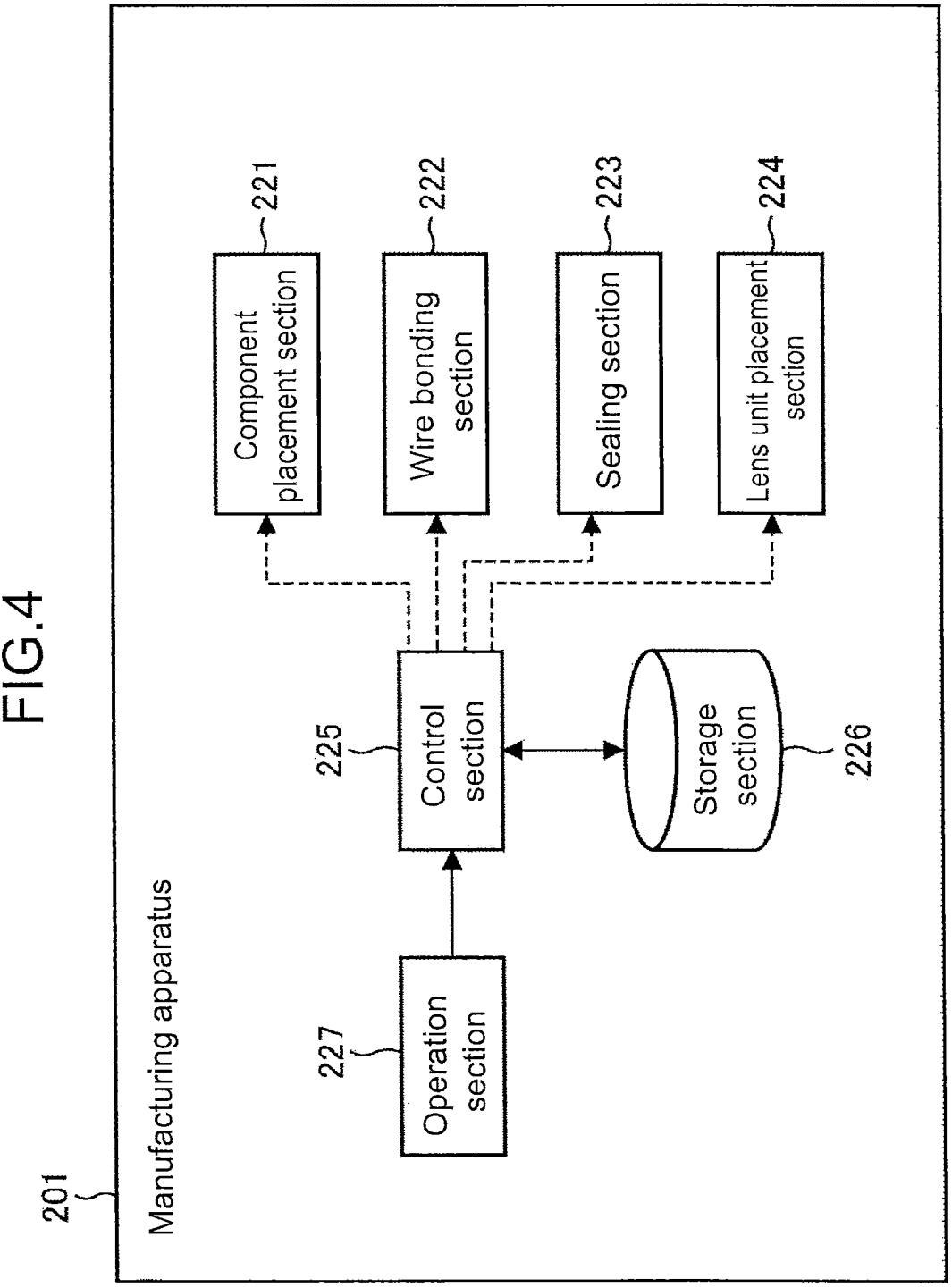
FIG. 4 is a block diagram showing an exemplary configuration of a manufacturing apparatus of manufacturing a camera module.

FIG. 4 shows an exemplary configuration of a manufacturing apparatus 201 that manufactures the camera module 161.

This manufacturing apparatus 201 is configured to include a component placement section 221, a wire bonding section 222, a sealing section 223, a lens unit placement section 224, a control section 225, a storage section 226, and an operation section 227. In FIG. 4, solid arrows each indicate a signal line, and dotted arrows each indicate a control line.

The component placement section 221 is under the control of the control section 225, and places the conductive members $41_n$ and $42_n$ on the printed circuit board $21_n$ together with the surface-mounted components. The component placement section 221 performs a process of die bonding on the imaging sensor 61 whose light-receiving surface is covered by the transmissive member 61a.

The wire bonding section 222 is configured to include a heater, an ultrasonic oscillator, a sample stage, and others. The wire bonding section 222 is under the control of the control section 225, and performs a process of wire bonding for bonding between the printed circuit board $21_n$ and the imaging sensor 61.

The sealing section 223 uses the sealing resin 101 to seal the components on the printed circuit board $21_n$ to expose the surfaces of the components thereon, i.e., the conductive members $41_n$ and $42_n$, and the transmissive member 61a.

The lens unit placement section 224 places the lens unit 121 to the printed circuit board $21_n$ for attachment therebetween. The printed circuit board $21_n$ herein has been covered on the surface with the sealing resin 101. The lens unit placement section 224 then connects one ends of the connection terminals 141 and 142 of the lens unit 121 to the conductive members $41_n$ and $42_n$ on the printed circuit board $21_n$, respectively.

The control section 225 is configured by a CPU (Central Processing Unit), or others, and in accordance with an operation signal from the operation section 227, exerts control over the other components, i.e., the component placement section 221, the wire bonding section 222, the sealing section 223, and the lens unit placement section 224.

The storage section 226 is a hard disk, for example, and stores in advance a control program to be run by the control section 225. The storage section 226 performs writing (storage) of data instructed for writing by the control section 225, and performs reading of data instructed thereby for reading. Note here that the control program can be updated over a network such as the Internet, or can be updated using a storage medium including a new control program, for example.

The operation section 227 is configured by buttons or others for operation by an operator. The operation section 227 is operated by the operator, and supplies an operation signal corresponding to the operation to the control section 225. As an example, when the operator uses the operation section 227 to make a user operation or others for instructing the manufacturing of the camera module 161, in response thereto, the manufacturing apparatus 201 starts manufacturing the camera module 161.

[Description about Operation of Manufacturing Apparatus 201]

By referring to the flowchart of FIG. 5, described next is an exemplary camera module manufacturing process to be performed by the manufacturing apparatus 201.

This camera module manufacturing process is started when an operator uses the operation section 227 of the manufacturing apparatus 201 to perform an instruction operation to instruct the manufacturing of the camera module 161, for example. At this time, the operation section 227 supplies an operation signal corresponding to the operator's instruction operation to the control section 225. Based on the operation signal provided by the operation section 227 as such, the control section 225 exerts control over the other components, i.e., the component placement section 221, the wire bonding section 222, the sealing section 223, and the lens unit placement section 224, for manufacturing of the camera module 161.

To be more specific, in step S21, as shown in FIG. 1A, the component placement section 221 places the conductive members $41_n$ and $42_n$ on the printed circuit board $21_n$ together with the surface-mounted components that are not shown.

In step S22, the component placement section 221 places the transmissive member 61a on the light-receiving surface of the imaging sensor 61, and covers the light-receiving surface of the imaging sensor 61 by the transmissive member 61a.

In step S23, as shown in FIG. 1B, the component placement section 221 performs a process of die bonding on the imaging sensor 61.

In step S24, as shown in FIG. 1C, the wire bonding section 222 performs a process of wire bonding to establish connections between an inner lead (not shown) on the printed circuit board $21_n$ and an electrode pad (not shown) on the imaging sensor 61 using the metal wires $81_1$ to $81_8$ and the metal wires $82_1$ to $82_8$. By this process of wire bonding, the printed circuit board $21_n$ and the imaging sensor 61 are electrically connected.

In step S25, as shown in FIG. 2D, the sealing section 223 covers the surface of the printed circuit board $21_n$ by the sealing resin 101 so as to expose the surfaces of the components on the printed circuit board $21_n$, i.e., the conductive members $41_n$ and $42_n$, and the transmissive member 61a.

In step S26, as shown in FIG. 2E, the lens unit placement section 224 places the lens unit 121 to the printed circuit board $21_n$ for attachment therebetween. The printed circuit board $21_n$ herein has been provided with the sealing resin 101.

The lens unit placement section 224 then electrically connects one ends of the connection terminals 141 and 142 of the lens unit 121 to the conductive members $41_n$ and $42_n$ on the printed circuit board $21_n$, respectively. As a result, the camera module 161 is manufactured, and this is the end of the camera module manufacturing process.

As described above, with the camera module manufacturing process, the camera module 161 as shown in FIG. 3 can be manufactured, for example.

Also with the camera module manufacturing process, the placement of the conductive members $41_n$ and $42_n$ is concurrent with the placement of the surface-mounted components.

This thus prevents involvement of not only the process (step) of placing the surface-mounted components but also an additional process of placing the conductive members $41_n$ and $42_n$, thereby manufacturing the camera module 161 relatively small in size with no cost increase.

Furthermore, the camera module manufacturing process involves no additional process of cutting the sealing resin 101 using a dicing blade to expose the conductive member $41_n$ buried thereunder, thereby favorably suppressing reduction of yields, and adhesion of dust. With the adhesion of dust reduced as such, the camera module 161 can be prevented from being deteriorated in performance due to adhesion of dust.

2. Modification Examples

In the camera module manufacturing process, in step S21, the printed circuit board $21_n$ is provided with the conductive members $41_n$ and $42_n$, and then in step S25, the sealing resin 101 is so provided as to expose therefrom the surfaces of the conductive members $41_n$ and $42_n$.

This is not restrictive, and in the camera module manufacturing process, the process of step S21 may be performed after the completion of the process of step S25, for example.

That is, after the completion of the process of step S25, the printed circuit board $21_n$ is partially exposed for placement of the conductive members $41_n$ and $42_n$ by laser irradiation or others to partially go through the sealing resin 101, i.e., to make holes to a part thereof, for example.

The process of step S21 is then performed, i.e., the conductive members $41_n$ and $42_n$ are placed to the portions made ready therefor on the printed circuit board $21_n$, and then the process of step S26 can be performed.

Moreover, with the camera module 161, the imaging sensor 61 is electrically connected to the inner lead on the printed circuit board $21_n$ by wire bonding, for example. However, this is not the only option to establish the connection between the imaging sensor 61 and the inner lead on the printed circuit board $21_n$.

To be more specific, alternatively, a through electrode, e.g., TSV (through-silicon via), may be formed to go through the imaging sensor 61 for an electrical connection with the inner lead on the printed circuit board $21_n$, for example.

In this case, unlike the case with the connection by wire bonding, the metal wires are not disposed radially around the imaging sensor 61. This thus reduces the area on the printed circuit board $21_n$ for placement of the imaging sensor 61 or others.

As such, with a through electrode, for example, the printed circuit board $21_n$ can be reduced in size compared with the case of using the metal wires for wire bonding so that the resulting camera module 161 can be reduced in size.

Alternatively, the imaging sensor 61 and the printed circuit board $21_n$ may be electrically connected to each other by a metal wire adhered as an electrode to the side surface of the imaging sensor 61, i.e., the surface thereof located in the horizontal direction of FIG. 3, for example.

If this is the case, compared with the case of connecting the imaging sensor 61 and the printed circuit board $21_n$ by wire bonding, as shown in FIG. 1C, the inner lead on the printed circuit board $21_n$ is allowed to be in the close vicinity of the imaging sensor 61 so that the printed circuit board $21_n$ is reduced in size. As such, with the electrode (metal wire) adhered to the side surface of the imaging sensor 61, the camera module 161 can be reduced in size compared with the case with the process of wire bonding.

Still alternatively, to reduce the size of the camera module 161, the electrode adhered to the side surface or others of the imaging sensor 61 may be used together with a through electrode.

In the above embodiment, described is the camera module 161 as shown in FIG. 3. This is surely not restrictive, and the camera module 161 may not be provided with the transmissive member 61a, for example. If this is the configuration, the sealing resin 101 is so shaped as to expose therefrom the connection surfaces of the conductive members $41_n$ and $42_n$ (surfaces for connection with the connection terminals 141 and 142), and the surface of the imaging sensor 61.

Also in the above embodiment, the metal wires are used to establish any electrical connection, e.g., connection between the imaging sensor 61 and the printed circuit board $21_n$. The member for use of electrical connection as such is not restricted to the metal wires, and any type of member may be used as long as it is conductive. Moreover, the member is not necessarily to be a wire.

Also in the above embodiment, the conductive members $41_n$ and $42_n$ are described to have the same height from the surface of the printed circuit board $21_n$. Alternatively, the conductive members $41_n$ and $42_n$ may have different heights. If this is the case, the sealing resin 101 is so shaped as to expose therefrom the connection surfaces of the conductive members $41_n$ and $42_n$ different in height, and the surface of the transmissive member 61a.

The present disclosure can employ the following structures.

(1) A camera module, including:
an imaging sensor including a light-receiving surface configured to receive light gathered by a lens unit, the lens unit including a lens and a drive section driving the lens;
a conductive member being connected to the drive section for supply of power to the drive section;
a plate-like member being provided with the imaging sensor and the conductive member; and
a sealing member being formed by sealing the imaging sensor and the conductive member, the conductive member being exposed at a connection part for connection to the drive section, the imaging sensor being exposed at the light-receiving surface.

(2) The camera module according to (1), in which
the plate-like member is provided with the lens unit to cover the imaging sensor, and
the connection part and the light-receiving surface are exposed from a surface of the sealing member opposing the lens unit.

(3) The camera module according to (1) or (2), further including
a transmissive member covering the light-receiving surface of the imaging sensor to pass therethrough the light from the lens unit, in which
the sealing member is formed by sealing the imaging sensor and the conductive member in a state where the connection part and the light-receiving surface are exposed, the light-receiving surface being covered by the transmissive member.

(4) The camera module according to (1) to (3), in which
the imaging sensor is electrically connected to the plate-like member by at least one of a through electrode and an adhesion electrode, the through electrode being formed by going through the imaging sensor, the adhesion electrode being formed by adhering to the imaging sensor.

(5) A manufacturing apparatus, including:
a placement section configured to provide a conductive member to a plate-like member including an imaging sensor, the imaging sensor including a light-receiving surface configured to receive light gathered by a lens unit, the lens unit including a lens, and a drive section driving the lens, the conductive member being connected to the drive section for supply of power to the drive section; and
a sealing section configured to seal the imaging sensor and the conductive member, the conductive member being exposed at a connection part for connection with the drive section, the imaging sensor being exposed at the light-receiving surface.

(6) A method of manufacturing a camera module by a manufacturing apparatus, including, for execution by the manufacturing apparatus:
providing a conductive member to a plate-like member including an imaging sensor, the imaging sensor including a light-receiving surface configured to receive light gathered by a lens unit, the lens unit including a lens and a drive section driving the lens, the conductive member being connected to the drive section for supply of power to the drive section; and
sealing the imaging sensor and the conductive member, the conductive member being exposed at a connection part for connection with the drive section, the imaging sensor being exposed at the light-receiving surface.

It should be noted herein that the steps for describing a series of steps above include not only the processes to be executed sequentially in the described order but also the processes to be executed not necessarily sequentially but concurrently or discretely.

While the present disclosure has been described in detail, the foregoing description is in all aspects illustrative and not restrictive. It is understood that numerous other modifications and variations are to be devised without departing from the scope of the present disclosure.

The present disclosure contains subject matter related to that disclosed in Japanese Priority Patent Application JP 2011-173694 filed in the Japan Patent Office on Aug. 9, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A camera module, comprising:
an imaging sensor including a light-receiving surface configured to receive light gathered by a lens unit, the lens unit including an aperture to receive the light, a lens and an actuator to drive the lens;
a conductive member configured to connect to terminals of the actuator to supply power to the actuator, the terminals of the actuator being located at a bottom surface of the lens unit that is opposite a surface of the lens unit that includes the aperture, the terminals of the actuator extending in a direction opposite from the surface of the lens unit that includes the aperture;

a plate member provided with the imaging sensor and the conductive member;

a sealing member formed by sealing the imaging sensor and the conductive member, wherein the sealing member seals at least a side surface of the imaging sensor, the conductive member being exposed at a connection part for connection to the terminals of the actuator, the imaging sensor being exposed at the light-receiving surface; and a transmissive member disposed directly on the light-receiving surface of the imaging sensor and configured to cover the light-receiving surface of the imaging sensor, the transmissive member passing the light from the lens unit.

2. The camera module according to claim 1, wherein the plate member is provided with the lens unit to cover the imaging sensor, and the connection part and the light-receiving surface are exposed from a surface of the sealing member opposing the lens unit.

3. The camera module according to claim 1, wherein the sealing member is formed by sealing the imaging sensor and the conductive member in a state where the connection part and the light-receiving surface are exposed, the light-receiving surface being covered by the transmissive member.

4. The camera module according to claim 1, wherein the imaging sensor is electrically connected to the plate member by at least one of a through electrode and an adhesion electrode, the through electrode being formed by going through the imaging sensor, the adhesion electrode being formed by adhering to the imaging sensor.

5. The camera module according to claim 1, wherein the sealing member is a light-shielding resin.

6. The camera module according to claim 1, further comprising:

an infrared light cutting filter disposed between the bottom surface of the lens unit and the light receiving surface of the imaging sensor.

7. A manufacturing apparatus, comprising:

circuitry configured to provide a conductive member to a plate member including an imaging sensor, the imaging sensor including a light-receiving surface configured to receive light gathered by a lens unit, the lens unit including a lens and an actuator to drive the lens, the conductive member being connected to terminals of the actuator to supply power to the actuator, the terminals of the actuator being located at a bottom surface of the lens unit that is opposite a surface of the lens unit including an aperture to receive the light, the terminals of the actuator extending in a direction opposite from the surface of the lens unit that includes the aperture, provide a transmissive member disposed directly on the light-receiving surface of the imaging sensor and configured to cover the light-receiving surface of the imaging sensor, the transmissive member passing the light from the lens unit; and seal the conductive member and at least a side surface of the imaging sensor, the conductive member being exposed at a connection part to connect to the actuator, the imaging sensor being exposed at the light-receiving surface.

8. A method of manufacturing a camera module by a manufacturing apparatus, comprising:

providing, by a manufacturing apparatus, a conductive member to a plate member including an imaging sensor, the imaging sensor including a light-receiving surface configured to receive light gathered by a lens unit, the lens unit including a lens and an actuator to drive the lens, the conductive member being connected to terminals of the actuator to supply power to the actuator, the terminals of the actuator being located at a bottom surface of the lens unit that is opposite a surface of the lens unit including an aperture to receive the light, the terminals of the actuator extending in a direction opposite from the surface of the lens unit that includes the aperture;

providing, by the manufacturing apparatus, a transmissive member disposed directly on the light-receiving surface of the imaging sensor and configured to cover the light-receiving surface of the imaging sensor, the transmissive member passing the light from the lens unit; and sealing, by the manufacturing apparatus, the conductive member and at least a side surface of the imaging sensor, the conductive member being exposed at a connection part to connect to the terminals of the actuator, the imaging sensor being exposed at the light-receiving surface.

* * * * *